US011006616B2

(12) United States Patent
Naitove et al.

(10) Patent No.: US 11,006,616 B2
(45) Date of Patent: May 18, 2021

(54) ANIMAL ENRICHMENT SYSTEM AND METHOD

(71) Applicant: WildThink, Fort Collins, CO (US)

(72) Inventors: Nicholas Naitove, Northglenn, CO (US); Emily Cain, Des Moines, IA (US)

(73) Assignee: WildThink, Fort Collins, CO (US)

( * ) Notice: Subject to any disclaimer, the term of this patent is extended or adjusted under 35 U.S.C. 154(b) by 326 days.

(21) Appl. No.: 16/173,712

(22) Filed: Oct. 29, 2018

(65) Prior Publication Data
US 2019/0124886 A1 May 2, 2019

Related U.S. Application Data

(60) Provisional application No. 62/578,895, filed on Oct. 30, 2017.

(51) Int. Cl.
*A01K 15/02* (2006.01)
*A01K 5/02* (2006.01)
*A01K 1/03* (2006.01)

(52) U.S. Cl.
CPC .............. *A01K 15/02* (2013.01); *A01K 1/031* (2013.01); *A01K 5/02* (2013.01)

(58) Field of Classification Search
CPC ........ A01K 15/02; A01K 5/02; A01K 5/0233; A01K 5/0241
See application file for complete search history.

(56) References Cited

U.S. PATENT DOCUMENTS 3,727,740 A * 4/1973 Evans .................. A01K 15/025
194/239
4,727,825 A * 3/1988 Houghton .............. A01K 15/02
119/707
(Continued)

FOREIGN PATENT DOCUMENTS

WO WO 2020045700 A1 * 3/2020 ............... A01K 7/02

OTHER PUBLICATIONS

Pearce, Burnard. "The Effects of Space, Estrus, and Coalitions Upon the Dominance Hierarchy of Mature, Long-Term Associate, Captive Chimpanzees." The University of Oklahoma, ProQuest Dissertations Publishing, 1970. 7021836. Jun 15, 2010. <https://core.ac.uk/download/pdf/215224423.pdf> (Year: 1970).*
(Continued)

*Primary Examiner* — Peter M Poon
*Assistant Examiner* — Morgan T Barlow
(74) *Attorney, Agent, or Firm* — Bishop, Diehl & Lee, Ltd.

(57) ABSTRACT

An enrichment system and method for animals in captivity is disclosed. Generally speaking, the system includes an automated dispenser and a plurality of tokens to be placed about an animal enclosure. The dispenser includes a suitable housing, a reservoir for containing animal-suitable rewards, a token receptacle, a reward output connected to the reservoir, and a mechanism for releasing animal-suitable rewards from the reservoir into the reward output when tokens are deposited into the receptacle. The mechanism for releasing animal suitable rewards is activated by the deposit of a token in the token receptacle. The unique method includes placing tokens about an enclosure for an animal, positioning an animal reward system at least proximate the enclosure, allowing an animal in captivity to find tokens, teaching the animal to deposit tokens within the token receptacle to
(Continued)

thereby automatically activate the mechanism for releasing animal-suitable rewards, and allowing the animal to collect dispensed rewards from the reward output.

15 Claims, 8 Drawing Sheets

(56) References Cited

U.S. PATENT DOCUMENTS

| | | | | |
|---|---|---|---|---|
| 4,841,911 A * | 6/1989 | Houghton | | A63F 9/0078 |
| | | | | 119/707 |
| 9,320,960 B1 * | 4/2016 | Ward | | A01K 15/02 |
| 2003/0004652 A1 * | 1/2003 | Brunner | | A01K 1/031 |
| | | | | 702/19 |
| 2004/0050342 A1 * | 3/2004 | Armstrong | | A01K 5/0275 |
| | | | | 119/707 |
| 2008/0282988 A1 * | 11/2008 | Bloksberg | | A01K 15/021 |
| | | | | 119/51.02 |
| 2010/0089327 A1 * | 4/2010 | Gross | | A01K 15/025 |
| | | | | 119/51.01 |
| 2012/0077159 A1 * | 3/2012 | Araujo | | A01K 1/035 |
| | | | | 434/236 |
| 2012/0180731 A1 * | 7/2012 | Garner | | A01K 1/031 |
| | | | | 119/417 |
| 2013/0228138 A1 * | 9/2013 | Hamill | | A01K 15/025 |
| | | | | 119/707 |
| 2014/0311420 A1 * | 10/2014 | Albuquerque | | A01K 15/02 |
| | | | | 119/712 |
| 2015/0109439 A1 * | 4/2015 | Shani | | A01K 15/02 |
| | | | | 348/143 |
| 2015/0296746 A1 * | 10/2015 | Ottosson | | A01K 15/025 |
| | | | | 119/707 |
| 2016/0295836 A1 * | 10/2016 | Cheng | | A01K 15/025 |
| 2016/0316716 A1 * | 11/2016 | Hanson | | A01K 15/02 |
| 2016/0324121 A1 * | 11/2016 | Rains | | A01K 1/0107 |
| 2017/0035024 A1 * | 2/2017 | Parness | | A01K 5/0233 |
| 2017/0196196 A1 * | 7/2017 | Trottier | | A01K 5/0283 |
| 2018/0084765 A1 * | 3/2018 | Kanwal | | A01K 1/03 |
| 2018/0092331 A1 * | 4/2018 | Zuidhof | | A01K 5/0291 |
| 2018/0235178 A1 * | 8/2018 | Sapir | | G01N 33/0001 |
| 2019/0124886 A1 * | 5/2019 | Naitove | | A01K 5/02 |
| 2019/0133075 A1 * | 5/2019 | Holovin | | A01K 29/005 |

OTHER PUBLICATIONS

Appolloni, Simon. "Convergent Knowing: Explorations of a Sustained—and "Sustainable"—Theological Reflection on Science, Environment, and Liberation." University of Toronto (Canada), ProQuest Dissertations Publishing, 2014. 10158202. Sep. 22, 2016. (Year: 2014).*

Pierce et al. "Wild Justice Redux: What We Know About Social Justice in Animals and Why it Matters." Soc Just Res (2012) 25:122-139. Springer Science+Business Media, LLC 2012 (Year: 2012).*

* cited by examiner

ANIMAL ENRICHMENT SYSTEM AND METHOD

RELATED APPLICATION

The present application claims the filing priority of U.S. Provisional Application No. 62/578,895, titled "Animal Enrichment System And Method" and filed on Oct. 30, 2017. The '895 application is hereby incorporated by reference.

TECHNICAL FIELD OF THE INVENTION

The present invention relates to an enrichment system and methods for use with captive animals. Specifically, the invention relates to an enrichment system and method for captive animals to promote better mental and physical health by encouraging the use of appropriate species-specific behaviors and problem solving tasks.

BACKGROUND OF THE INVENTION

Zoos and animal sanctuaries play a crucial role in education, conservation, and serving as places of refuge for animals. These facilities face the challenge of providing each and every one of their animals with means of mental and physical stimulation, because without it, animals exhibit signs of detrimental stress and boredom. This is particularly true for the great apes.

Great apes—i.e., chimpanzees, gorillas and orangutans—are extremely intelligent animals. They live in environments where survival can be challenging, so they've evolved to have excellent problem solving skills, memories, and capacities to complete complex tasks. When these animals are put into zoo settings, they get bored because they don't have to use their brains to their full potential; this results in stress-related behaviors and excessive inactivity. Orangutans and gorillas will often pull out their hair, pick at their skin, pace, and rock back and forth for hours.

In an attempt to engage the animals, caretakers will give the animals enrichment (which is anything given to an animal to stimulate mental and physical activity), but the enrichment that is currently available fails to address one or more of the most important aspects of effective enrichment, particularly with apes. Apes are highly-intelligent animals and they benefit most from enrichment that is novel, time-consuming, encourages natural ape-specific behaviors, and is able to be tailored to the skill level of individual animals. The problem is how to create puzzles, toys, and games to occupy the minds and bodies of the apes in human care. The puzzles and toys should provide the animals with experiences that mimic ones they would normally encounter in the wild—for example, foraging for food or using a simple tool to accomplish a task. The enrichment provided by the present system is designed to be changed in hundreds of ways to preserve novelty and cater to individual animal's needs.

Until the invention of the present application, these and other problems in the prior attempts went either unnoticed or unsolved by those skilled in the art. The present system provides a unique and advanced enrichment for captive animals which challenges their mental and physical abilities. The present system and methods rely on the use of an animal's natural curiosity, specific problem-solving skills, and foraging skills to promote physical and mental activity.

SUMMARY OF THE INVENTION

There is disclosed herein an improved system and method for providing enrichment to animals in captivity and which avoid the disadvantages of prior systems and methods while affording additional structural and operating advantages.

Generally speaking, the system is comprised of an automated dispenser having a housing, a reservoir for containing animal suitable rewards, a token receptacle, a reward output connected to the reservoir, and a mechanism for releasing animal suitable rewards from the reservoir into the reward output, and a plurality of tokens. The mechanism for releasing animal suitable rewards is activated by deposit of a token in the token receptacle.

In a specific embodiment, the animal reward system uses a plurality of tokens—currently small circular plastic pieces. In a final form, the tokens may be coded into at least two, if not several visually-identifiable different groups (e.g., different colors or symbols or shapes). The variation can improve the quality of the enhancement.

In an embodiment, the dispenser comprises at least two different reservoirs for rewards. The reservoirs may be primary and secondary reservoirs, containing the same or similar reward items, or they may be alternative reservoirs activated by different tokens.

In another specific embodiment, the system comprises a plurality of automated dispensers wherein the dispensers may be activated by the same tokens or each by a different coded token. Preferably, the dispensers would also be visually-identifiable with the different tokens (e.g., a green dispenser would be activated by a green token, a blue dispenser by a blue token, etc.).

In still another embodiment, the animal reward system may provide each of the plurality of automated dispensers with a different animal-suitable reward. Alternatively, the amount of the reward may be varied at each of the different dispensers.

There is also set forth herein, a unique method for providing enrichment to an animal in captivity. Generally speaking, the method comprises the steps of placing at least one of a plurality of tokens about an enclosure for an animal, positioning an animal reward system at least proximate the enclosure, positioning the token receptacle and the reward output of the automated dispenser to be accessible from the enclosure, allowing an animal in captivity to find the at least one of a plurality of tokens placed within the enclosure, teaching the animal to deposit the token within the accessible token receptacle to thereby activate the mechanism for releasing animal suitable rewards, allowing the animal to collect dispensed rewards from the reward output.

The animal reward system for the described method preferably comprises an automated dispenser having a housing, a reservoir for containing animal suitable rewards, a token receptacle, a reward output connected to the reservoir, and a mechanism for releasing animal suitable rewards from the reservoir into the reward output, wherein the mechanism for releasing animal suitable rewards is activated by deposit of a token in the token receptacle.

In a specific embodiment, the method comprises coding the plurality of tokens into at least two different groups (e.g., two different colors or symbols or shapes). As such, an embodiment of the method comprises a plurality of automated dispensers positioned about the enclosure with each dispenser being activated by a different coded token. Further, in still another embodiment, the plurality of automated dispensers may each comprise a different animal suitable reward.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-7, there is illustrated an animal enrichment system, generally designated by the numeral 10, including specific components of the system 10. The particular illustrated system 10 is for use with captive great apes. However, while all the embodiments illustrated are directed to an enclosure of apes, application of the system and methods to an enclosure of elephants is also possible. In fact, it should be understood that the principles of the invention can be more broadly applied to a system for providing enrichment to a wider range of captive animals, especially other primates, and including domestic animals.

Figure 1:
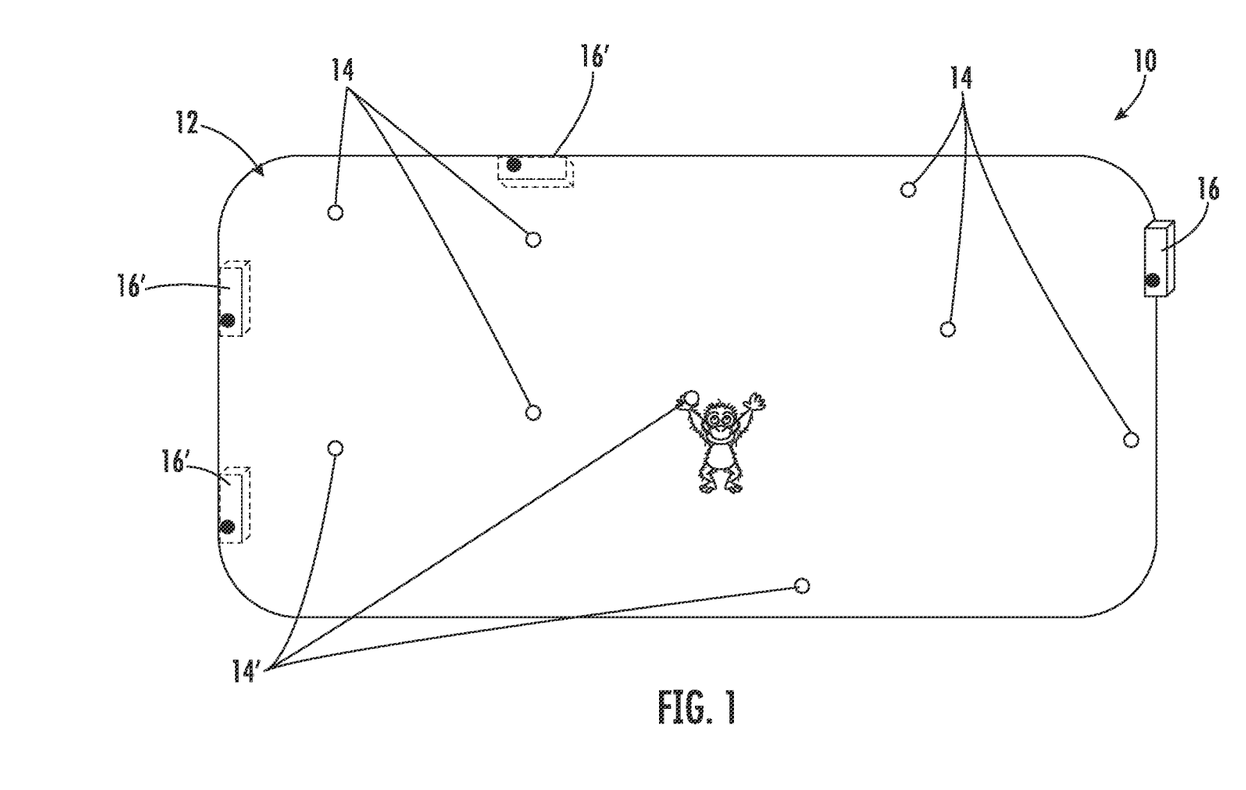
FIG. 1 is a top view of an embodiment of the disclosed animal enrichment system illustrating a plurality of tokens placed about an animal enclosure and a primary reward dispenser (solid lines) with optional secondary dispensers (broken lines) positioned about the periphery of the enclosure.
Figure 2:
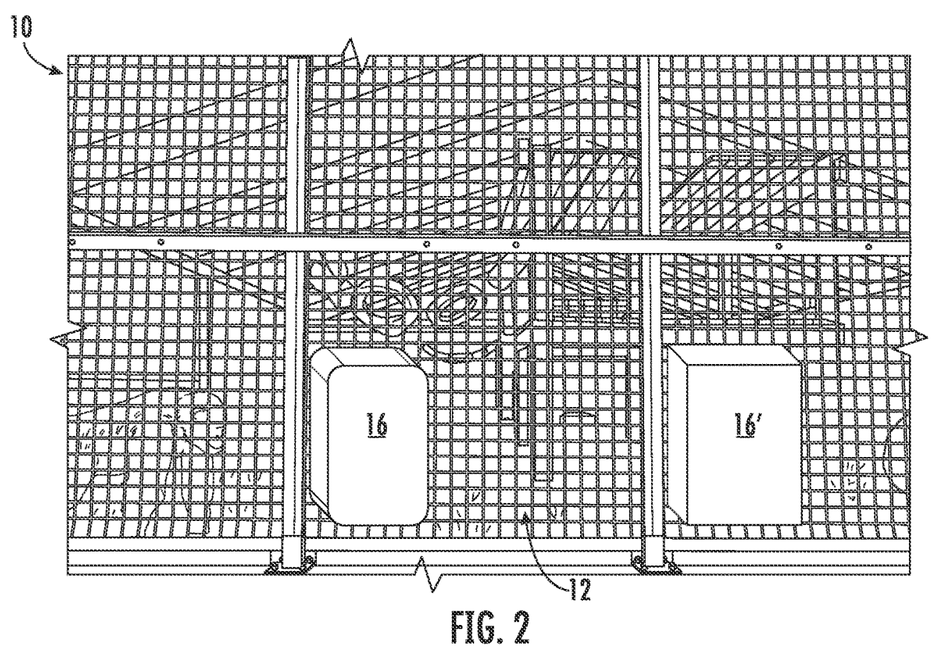
FIG. 2 is another view of an embodiment of the automated dispenser attached to an animal enclosure.

As can be seen in FIG. 1, the system 10 is generally comprised of an animal enclosure 12, a plurality of tokens 14 and an automated reward dispenser 16. A typical ape enclosure is shown in FIG. 2. The enclosure 12 can be almost any type of enclosure typically used to provide a barrier between animals (including humans in the case of zoo settings), including but not limited to fencing, glass walls, rock formations, brick walls, block walls, moats, artificial formations, electronic fence (e.g., "invisible" fence for pets) and combinations thereof. In a more open scenario, such as use with domesticated animals, the enclosure may be a house, room, yard or a park.

The disclosed system 10 is a brand new type of enrichment for captivated animals. The automated dispenser 16 works much like a vending machine. The dispenser 16 accepts tokens 14 at the receptacle 22 in exchange for a small amount of food, and can be made to be compatible with nuts, dried fruits, popcorn, small toys and other animal-suitable rewards. The automated reward dispenser 16 should be positioned proximate the enclosure 12 such that it is at least partially accessible to animals within the enclosure 12. For some animals, the preferred location for a dispenser 16 is going to be within the enclosure 12. In the event that multiple dispensers (i.e., secondary dispenser 16') are used, they can be dispersed about the enclosure (as shown) or positioned together in one area.

Figure 3:
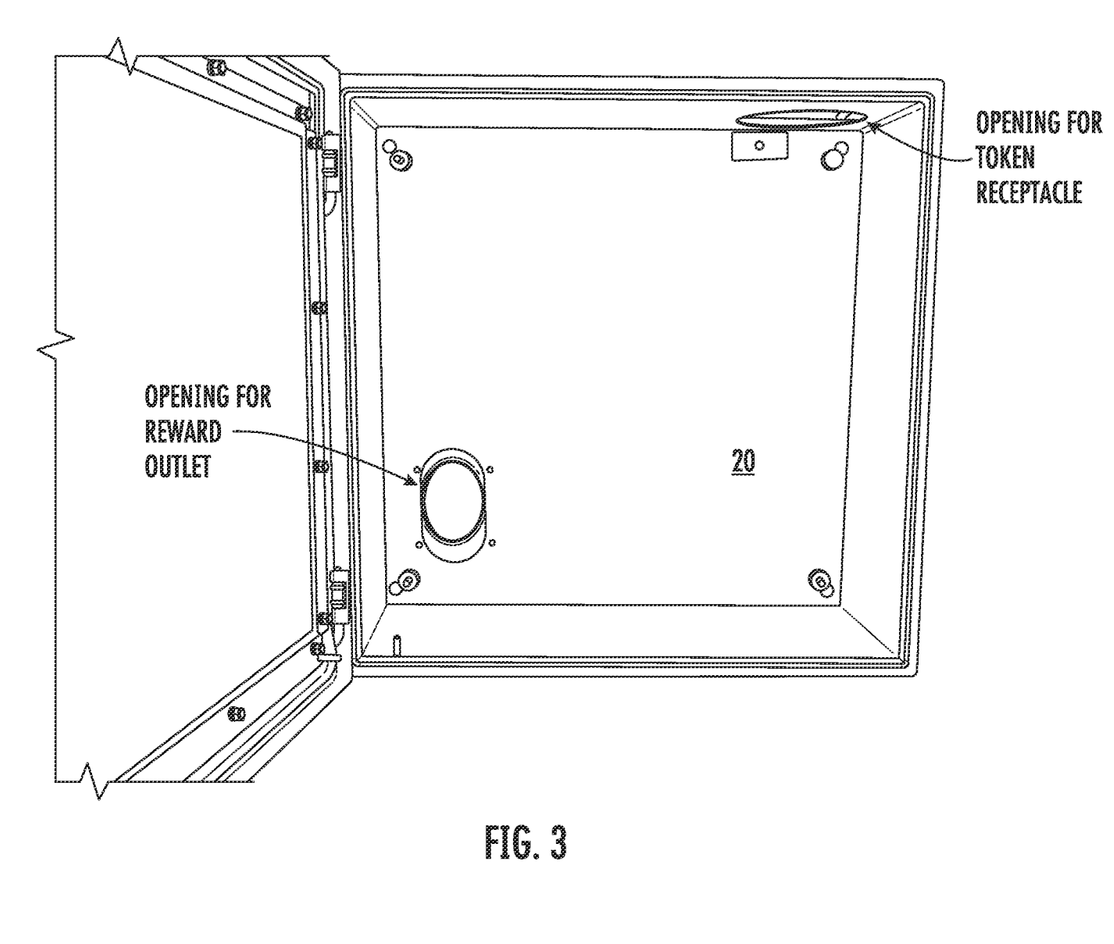
FIG. 3 is a front view of an open housing for an embodiment of the disclosed reward dispenser.
Figure 4:
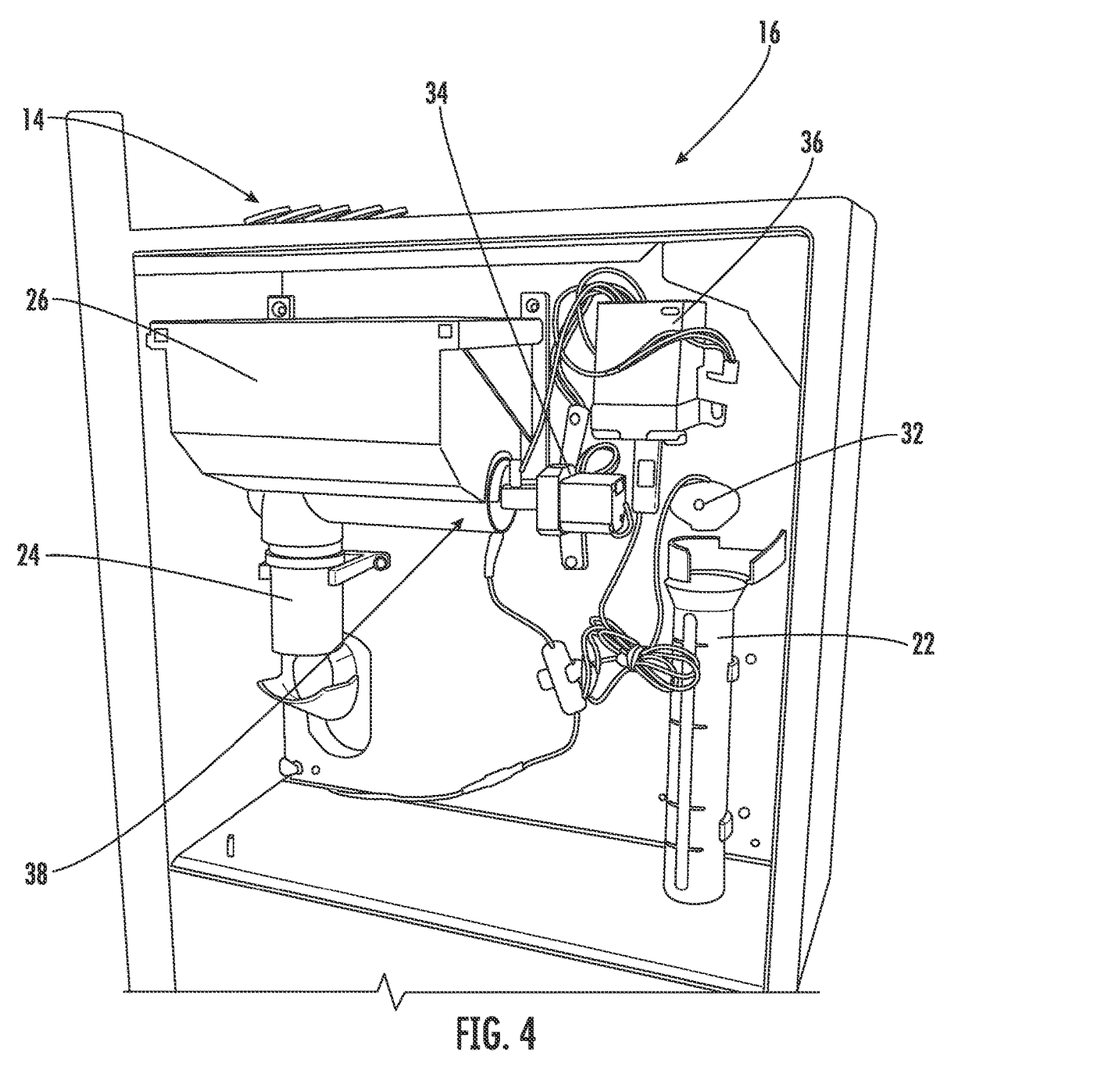
FIG. 4 is an internal view of an embodiment of the disclosed automated dispenser.
Figure 5:
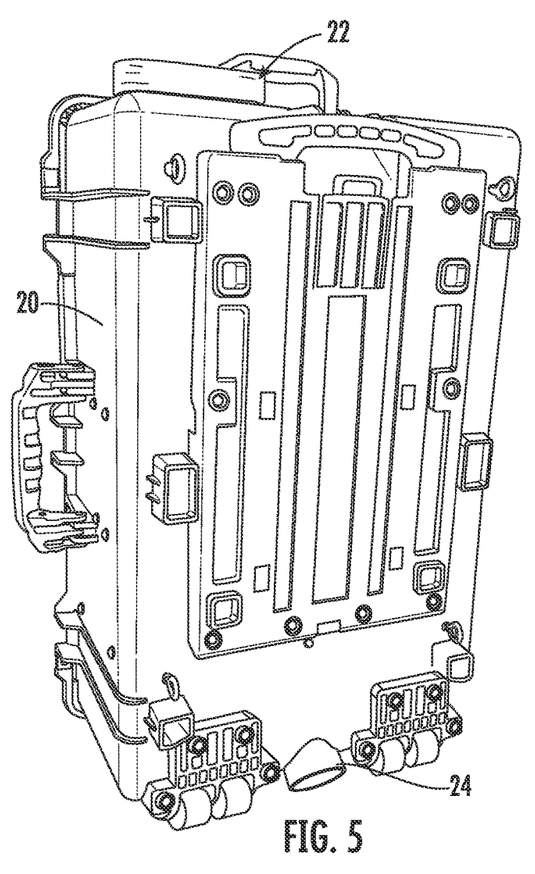
FIGS. 5 and 6 are views of another embodiment of housing for a disclosed automated dispenser.

With reference to FIGS. 3-4, an embodiment of the automated dispenser 16 (and 16') is illustrated. The exterior of dispenser 16 is comprised of a housing 20 to protect the internal components, a token receptacle 22, and a reward output 24. Looking at FIG. 4, the internal components of the dispenser 16 include a single reservoir 26 for containing animal-suitable rewards, and a mechanism 28 for releasing animal suitable rewards from the reservoir into the reward output 24. In the illustrated embodiment, the reservoir 26 includes an auger 38 which is turned by an actuator 34 (e.g., a servomotor) to allow a calibrated amount of the reward to enter the output tube 24. When a token 14 is deposited into the token receptacle 22, a sensor 32 signals the actuator 34 to operate the auger 38 to dispense the reward.

To increase the challenge level, the use of multiple dispensers 16/16' is possible, as illustrated in FIG. 1. A primary dispenser 16 could contain a plurality of a second token 14' in the reservoir 26 to dispense as a reward. That is, after finding and depositing a first token 14 in a primary dispenser 16, the animal would receive the second token 14' as a reward. The animal would then need to take the second token 14' to a secondary dispenser 16' to receive a food reward. This type of linking game could be extended to include additional dispensers and tokens (e.g., a chain of three or four dispensers) as necessary and appropriate for the animal's skill level.

A second preferred embodiment of the system 10 is illustrated as a dual reservoir system in FIGS. 5-10. Similar to the single reservoir system of FIG. 4, the dual system dispenser 16 includes a housing 20, a token receptacle 22, and a reward output/chute 24. A sensor 32 detects the received token 14—this may be done with motion sensors or color sensors—and signals a processor 36 which then activates an actuator 34 connected to an auger 38. The auger 38 is turned to direct an amount of reward from the reservoir 26 into the outlet 24.

The use of an actuator 34 and auger 38 has shown to be a more reliable dispensing mechanism than the combination of an actuator 34 and door used in earlier embodiments. However, the use of the actuator and door configuration may be suitable for some limited applications.

Figure 6:
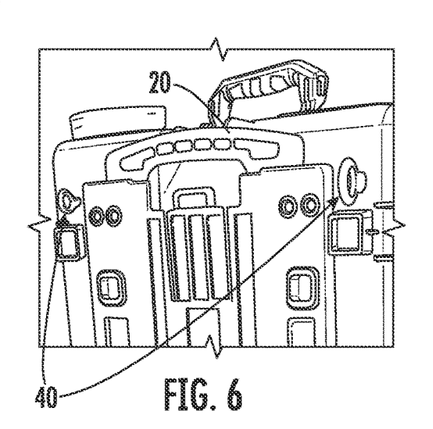
Figure 7:
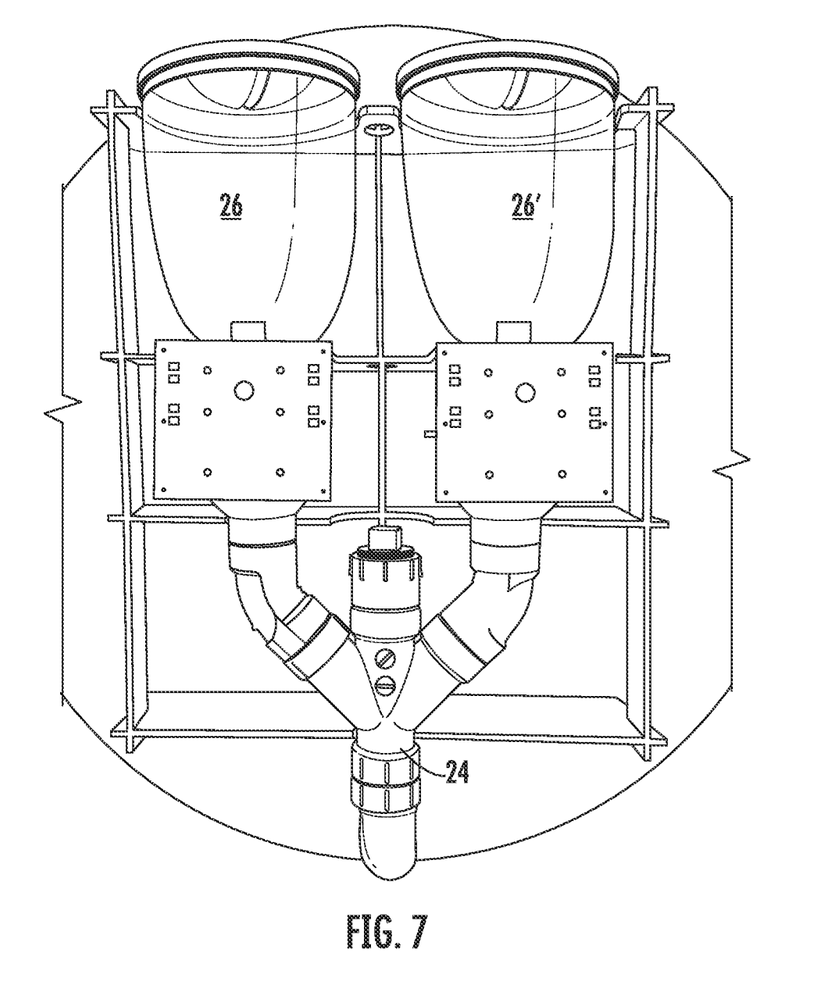
FIG. 7 is a front view of a dual reward reservoir used in another specific embodiment of the automated dispenser.

As shown in FIG. 6, the housing 20 of the dispenser 16 is equipped with hooks 40 to allow for mounting of the dispenser to, for example, fencing or a wall. Alternative mounting options, including a stand for placement on the ground, may be used as well. The housing 20 should be made from a durable material, such as HDPE, HIPS or metal, to protect the internal mechanisms of the dispenser 16.

The dual reservoir dispenser 16 includes two separate reward reservoirs 26 and 26' which dispense reward into the reward chute 24 upon activation of dispensing mechanisms 28 or 28' via deposit of a token 14 into the token receptacle 22. The processor 36 is able to distinguish between different tokens to activate the proper dispensing mechanism, 28 or 28'. This may be accomplished by using color sensors, image sensors, weight or size sensors, or in various other ways known to those of skill in the art.

Figure 8:
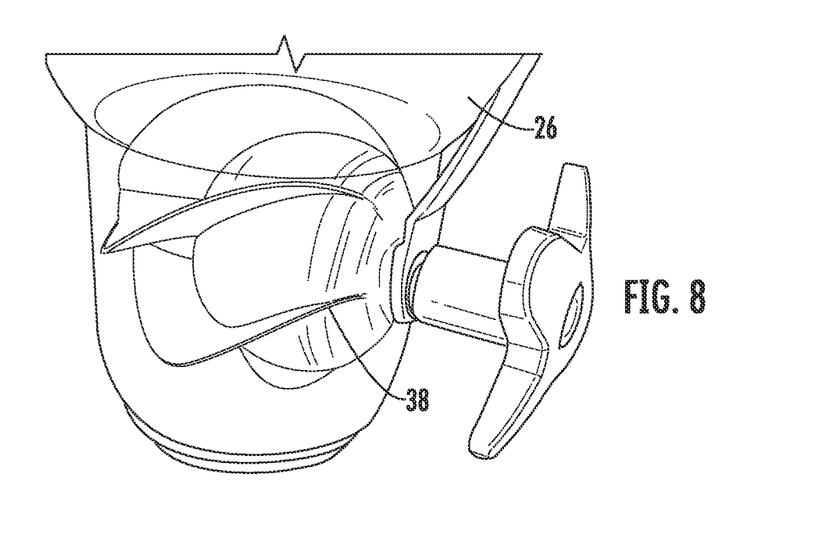
FIGS. 8 and 9 are views of embodiments of augers which may be used in the disclosed automated dispenser.
Figure 9:
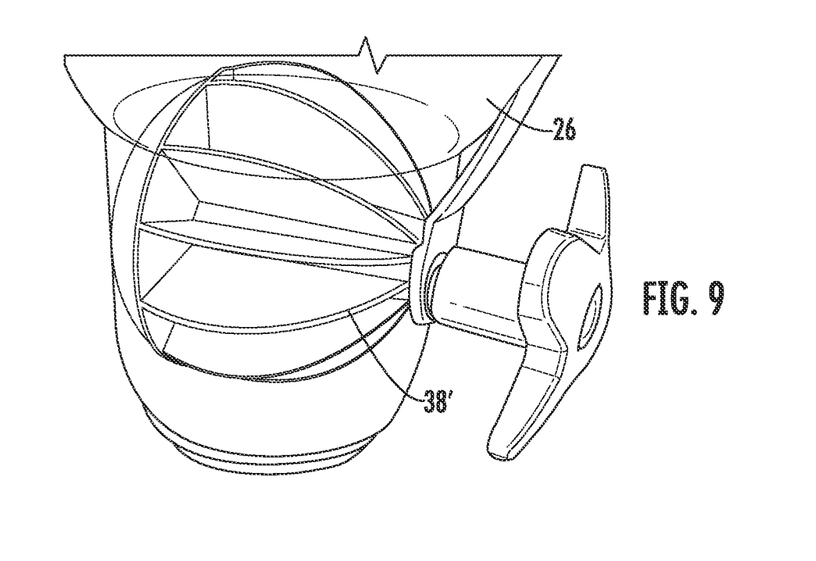
Figure 10:
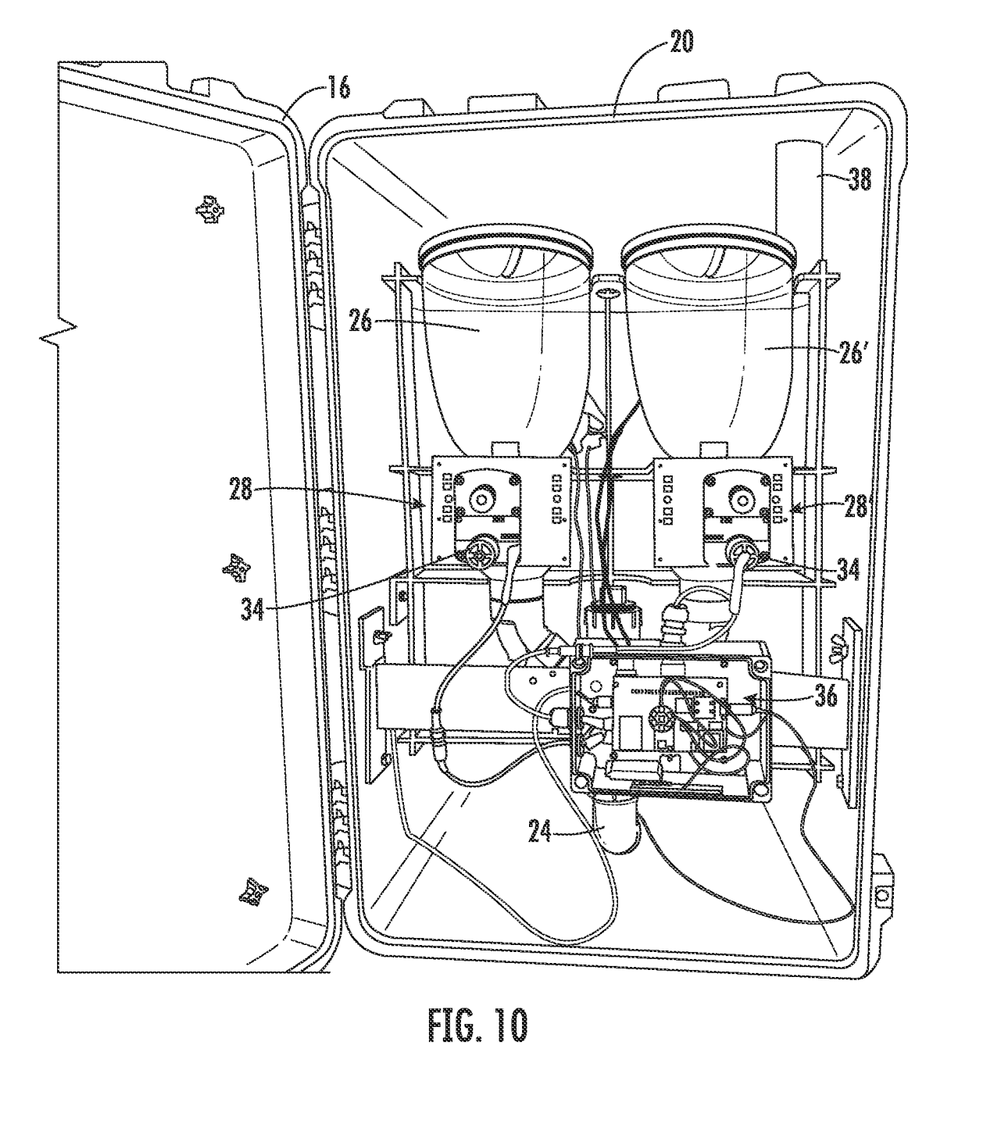
FIG. 10 is a front internal view of an embodiment of the disclosed automated dispenser having dual reward reservoirs.

FIGS. 8 and 9 illustrate two different augers 38 suitable for use in the dual reservoir dispenser 16. Other configurations may be suitable and customization may be necessary for larger, smaller or irregularly shaped rewards.

As for the two reservoirs, 26 and 26', each may comprise a similar reward, in which case one can be designated as the primary reservoir and the other as the secondary or back-up reservoir. This would allow the dispenser 16 to hold more reward and require less filing. Alternatively, the two reservoirs 26 and 26' may contain different rewards, presenting an additional challenge to animals having a preference for one reward over the other.

Introduction of System

During the initial introduction of the system 10 to an enclosure of animals, it is preferred to have all the tokens 14 be the same. Eventually, it may be desired to have a plurality of tokens 14 which are coded (e.g., different colors, symbols, shapes, etc.) into groups which correspond to one of the multiple dispensers 16/16' proximate the enclosure 12. Similarly, each of the dispensers 16/16' can be coded to correspond and accept only one type of the groups of tokens 14 (e.g., just red tokens). The different dispensers 16/16' can provide different rewards or different amounts of reward as well, which will be explained further below.

The plurality of tokens 14 can be positioned about the enclosure 12. They may be placed in the open, completely hidden (e.g., in a crevice of a log), or even concealed in a manner which requires the ape (or other animal) to work to acquire the token 14 (e.g., frozen within a block of ice). Once acquired, the ape can take the token 14 to the automated dispenser 16 (or corresponding secondary automated dispenser 16') to receive an animal-appropriate reward. Food rewards are preferred, but other non-edible rewards may work in different settings and with different animals. Varying the reward can include different types of rewards (e.g., different food treats) or changing the amount of the reward. Much of this variation can be accomplished through programming of the processor that controls the dispenser.

Animal caretakers can hide or scatter tokens 14 around an enclosure 12, and then animals can search for the tokens 14 and exchange them with the dispenser 16 for a reward. Tokens can be hidden in puzzle feeders and other enrichment devices for a more challenging task. The system 10 promotes foraging behaviors while encouraging animals to move and explore their environments in new ways. The system 10 adds steps to the traditional foraging process that require problem solving and physical activity, so animals spend their time engaging in natural behaviors instead of abnormal or boredom-based ones.

The system 10 can provide animals with a constant and ever-changing outlet for mental and physical activity. To use the dispenser 16, an animal has to search its enclosure for tokens 14 and then bring those tokens back to a dispenser 16/16' to exchange for food or other treats/rewards. An animal learns how to insert a token 14 into the token receptacle 22 for a food reward, but the real benefit of the system 10 lies in the retrieval of the tokens 14 themselves.

Tokens 14 can be scattered around the animal's enclosure 12 for a relatively easy task, or they can be combined with some type of existing enrichment (i.e. frozen in ice, in a puzzle, or hidden around the enclosure). However, to maximize the cognitive benefit of the system 10, tokens 14 must be challenging enough for the animal to obtain that the retrieval elicits thinking and problem solving, but they shouldn't be so difficult to retrieve that the animal gets frustrated and gives up. By finding this balance, animal caretakers can increase the time that an animal spends mentally and physically engaged in the enrichment system 10.

Early Testing

Highly intelligent species like orangutans can solve puzzles in a matter of minutes. Great ape caretakers face the challenge of finding an enrichment item that occupies a great deal of the animal's time without occupying a great deal of caretakers' time. A prototype of the current system 10 was used in an actual orangutan enclosure and was programmed to stay on for several hours at a time. Each of eight tokens was paired with a different enrichment item so that the time that an animal spent mentally and physically active was maximized. To limit food disbursement, the system 10 can be programmed to accept, for example, eight tokens 14 during a session. When scattering all eight tokens around an orangutan's enclosure in mostly plain view with no challenges involved, it took between ten and forty minutes for a single orangutan to collect and use all of the tokens. When presenting animals with tokens in puzzle feeders and rubber balls, animals spent up to entire hour and a half engaged in the enrichment.

One of the main benefits of the enrichment device is that there are options for manipulating the device to preserve novelty. Tokens can be hidden in different ways that require animals to exhibit a different set of skills to retrieve each token. Various sized, shaped, or colored tokens can be used to denote different rewards. The system 10 may also allow for the number of steps involved in acquiring a reward to be increased, thus making the challenge more complex.

Physical and Mental Stimulation

The system 10 adds steps to the foraging process by requiring the apes to first find a token and then travel to the dispenser 12 to exchange it for a food reward. Adding more steps to the feeding process increases the value of the reward. Furthermore, instead of foraging for food, or just being handed food, the apes have to work hard and use problem-solving skills in order to acquire their reward. Not only does the system 10 increase the amount of time spent foraging for animals, but it also provides the animals with opportunities for mental and physical exercise. The challenges that the tokens are paired with require the animal to use problem-solving skills to acquire them. In some species (like orangutans), problem solving may involve the use of tools to access a token. Tokens can also be hidden throughout an enclosure to encourage exploratory behavior. The system 10 gives animals like primates and birds that live in more complex three-dimensional environments a reason to climb or explore each level of their habitat.

The system 10 also supports the expression of species-specific behaviors. Species-specific behaviors are behaviors that are commonly observed by animals in the wild. For instance, wild orangutans live in the treetops collecting, breaking open, and eating fruit. The system 10 can be used to stimulate those behaviors in zoo-housed orangutans. By hanging tokens, or requiring orangutans to climb to access the token, caretakers can more closely mimic challenges found in the wild. While the system 10 is not something that an animal would naturally encounter in the wild, it can be used to simulate some of the challenges that animals may face in the wild.

Exemplary Study:

A study was conducted at the Cheyenne Mountain Zoo in Colorado Springs, Colo. The orangutans housed at the Cheyenne Mountain Zoo are housed in three separate groups. A first group was made up of two Sumatran Orangutans (*Pongo abelii*): Baka (male, born June 1990) and Sumagu (female, born October 1987). A second group was made up of Baka and Sumagu's son, Godek (male, born February 2009). A third group included three Bornean Orangutans (*Pongo pygmaeus*): Tujoh (male, born April 1994), Hadiah (female, born June 1996) and their daughter, Ember (female, born October 2014). The orangutans already knew a trading behavior, so when zookeepers asked the orangutans to bring them a token, the keepers would drop it into the vending machine and allow the apes to extract their reward directly from the machine instead of handing them a reward. Hadiah learned how to use the machine by observing Tujoh. Four of the six orangutans were observed in this study: Tujoh, Hadiah, Baka, and Sumagu.

The Cheyenne Mountain Zoo orangutan exhibit was composed of four separate indoor enclosures and one outdoor enclosure. During the time of the study, the orangutan groups were on a rotating schedule so that each group was in the outdoor exhibit once every three days. Three of the four enclosures along a wall of the building had shift doors that allow zookeepers to give the orangutans access to multiple enclosures at one time.

The orangutans were fed a diet of fruits, vegetables, and grains three times per day. The first feeding occurred at approximately 9:30 a.m., the second at 12:00 p.m., and the third at 4:30 p.m. Each group was given one or more novel enrichment devices (excluding the vending machine) in between daily feedings.

Since a baseline of behaviors exhibited in the absence of the vending machine was needed to compare collected data, the first portion of the study, which functioned as the control, involved observing behaviors of the orangutan populations without the vending machine present. Each observation consisted of watching an individual orangutan for 15 continuous minutes and recording all behaviors that an animal performed and the time that the animal performed them. Behaviors were chosen from an ape-specific behavior catalogue. At the beginning of each observation, the researcher recorded the time of day, the weather, which enclosure or enclosures the focal animal had access to, whether or not the animal had any novel enrichment items, and if the animal had been recently fed.

The second portion of this study consisted of observing the orangutans when they had the ability to find tokens and insert them into the vending machine. The method of observation was largely the same as the method for observing orangutan baseline behavior. However, when orangutans had access to the vending machine they were able to exhibit new behaviors that were not observed without the vending machine (i.e. 'vending machine interaction' or 'locomotion with token'). For observations that were conducted when the apes had the ability to search for tokens and use the vending machine, the researcher added a supplemental list of Token-Based Behaviors and Vending Machine Related Behaviors. At the beginning of each observation, the researcher recorded the same daily variables as were collected during the baseline observations (such as time of day and which enclosures the focal animal was able to access). In addition, the researcher noted which of the two prototype vending machines animals had access to, how many tokens were put in the exhibit, and how the tokens were presented to the apes. The researcher identified three main categories of token presentation: hand-thrown into the exhibit through the mesh doors, windows, and skylight; hidden in semi-discrete areas of the exhibit (i.e. in wood wool, under feeding tubs, and stuck in cracks of logs); and presented in enrichment (i.e. frozen in ice blocks, in Kong™ toys, or in brown paper bags filled with straw). Once all variables had been recorded, the researcher observed orangutan behavior. The researcher watched the focal orangutan for as long as the animal took to retrieve all tokens and exchange them with the vending machine. Occasionally the zoo would close prior to the focal animal gathering and using all of the tokens. The researcher recorded the start and end times of each behavior. The times of each token insertion were also recorded to determine if the orangutans were becoming more skilled at token retrieval and insertion.

Behaviors were categorized into three overarching groups: active behaviors, inactive behaviors, and undesirable behaviors. Inactive behaviors consisted of any behavior involving the animal sitting or laying relatively motionless without engaging in movements with a specific purpose or function. Table 1 below provides percentages for each of the four apes of the observed time spent on the behavior for each of the general groupings.

TABLE 1

|  | Tujoh | | Hadiah | | Baka | | Sumagu | |
| --- | --- | --- | --- | --- | --- | --- | --- | --- |
|  | Without Vending Machine | With Vending Machine | Without Vending Machine | With Vending Machine | Without Vending Machine | With Vending Machine | Without Vending Machine | With Vending Machine |
| Active behaviors | 55.53% | 99.96% | 47.56% | 87.90% | 30.43% | 80.23% | 34.11% | 68.16% |
| Inactive behaviors | 44.38% | 0.00% | 50.91% | 12.10% | 68.05% | 18.53% | 64.90% | 30.97% |
| Undesirable behaviors | 0.09% | 0.04% | 1.52% | 0.00% | 1.51% | 1.24% | 0.98% | 0.87% |

Separation of 'undesirable behaviors' from 'active behaviors' was necessary because undesirable behaviors are most often indicative of some underlying welfare concern. If the presence of the mentally and physically engaging animal vending machine was to decrease the prevalence of these undesirable behaviors, one might infer that these abnormal behaviors were due to some type of boredom or lack of stimulation. In this study, undesirable behaviors are any functionless, repetitive stereotypic behaviors (like rocking or pacing), abnormal feeding behaviors (like regurgitation and re-ingestion), self-directed behaviors (like picking at one's skin or pulling hair), and aggressive behaviors (like banging on the wall).

TABLE 2

| | | Without Vending Machine % of Total Duration | With Vending Machine % of Total Duration |
|---|---|---|---|
| Active | Active Observation | 4.83% | 7.22% |
| | Animal Interaction | 2.32% | 1.62% |
| | Enrichment Interaction | 5.32% | 9.33% |
| | Exhibit Furniture/Substrate | 1.90% | 4.52% |
| | Forage | 4.40% | 8.52% |
| | Gather/Modify Tool | 0.38% | 0.60% |
| | Groom Self | 1.26% | 0.08% |
| | Guest Interaction | 2.29% | — |
| | Locomotion | 7.36% | 10.25% |
| | Eat & Drink | 10.79% | 11.67% |
| | V.M. Related Behaviors | — | 16.94% |
| | Token-Related Behaviors | — | 7.01% |
| Inactive | Inactive Observation | 11.34% | 7.66% |
| | Rest | 44.89% | 13.05% |
| Undesirable | Bang on Walls | 0.00% | 0.35% |
| | Hard Scratching | — | 0.35% |
| | Head Roll | 0.02% | 0.00% |
| | Pick at Self | 1.01% | — |
| | Rocking | 0.03% | — |

*NOTE:
Some behaviors that were not of particular interest to this study were omitted from the table, so values in each column do not add up to 100%.

As shown in the "Active" section of TABLE 2, the presence of the vending machine introduced new behaviors that were not seen otherwise. Orangutans had opportunities to search for tokens, so a new sub-category of 'token-related behaviors' was created to show how much time animals spent interacting with tokens. It is important to note that there is not a 'searching for tokens' behavior because it would be difficult, if not impossible, to determine when an exploring animal is looking for tokens versus looking for other enrichment or food. Therefore, all actions that consisted of an orangutan exploring for food, tokens, or enrichment are classified as 'foraging'. The sub-category of 'vending machine' or 'VM' related behavior was also created to account for specific activities not otherwise apparent in the absence of the machine.

The overall results of the observations for the three categories of behavior (i.e., Active, Inactive, and Undesirable) for all four apes are summarized in TABLE 3 below.

TABLE 3

| | Without Vending Machine % of Total Duration | With Vending Machine % of Total Duration |
|---|---|---|
| Active | 41.84% | 78.63% |
| Inactive | 57.10% | 20.67% |
| Undesirable | 1.06% | 0.70% |

As shown by the above tables, the presence of the vending machine increased orangutan activity by 36.79% and decreased orangutan inactivity by 36.43%. Even undesirable activities were shown to decrease with the introduction and use of the vending machine.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An animal enrichment system comprising:
   an animal-suitable enclosure;
   a plurality of first animal-suitable tokens dispersed within the enclosure;
   a plurality of second animal-suitable tokens dispersed within the enclosure, wherein the second animal-suitable tokens are different from the first animal-suitable tokens;
   a first automated dispenser positioned within the enclosure and comprising:
      a housing,
      a reservoir containing animal-suitable rewards,
      a receptacle configured to accept individual animal-suitable tokens,
      a reward output connected to the reservoir, and
      a mechanism for automatically releasing an animal suitable reward from the reservoir into the reward output when the animal-suitable token is placed in the receptacle:
   a second automated dispenser positioned within the enclosure, wherein the first automated dispenser is activated by the first animal-suitable tokens and the second automated dispenser is activated by the second animal-suitable tokens.

2. The animal enrichment system of claim 1, further comprising additional automated dispensers positioned within the enclosure and activated by additional tokens different from the first and second tokens.

3. The animal enrichment system of claim 1, wherein each of the automated dispensers comprises a different animal-suitable reward.

4. The animal enrichment system of claim 1, wherein the animal-suitable rewards in the first automated dispenser comprise the second tokens.

5. A method for providing enrichment to an animal in captivity comprising the steps of:
   distributing a plurality of first animal-suitable tokens and a plurality of second animal-suitable tokens different from the first animal-suitable tokens within an animal-suitable enclosure;
   positioning a first automated dispenser within the enclosure, the automated dispenser comprising:
      a housing,
      a reservoir for containing animal-suitable rewards,
      a receptacle configured to accept the plurality of first animal-suitable tokens,
      a reward output connected to the reservoir, and
      a mechanism for automatically releasing animal-suitable rewards from the reservoir into the reward output when an animal-suitable token is placed in the receptacle;
   positioning a second automated dispenser positioned within the enclosure;

placing at least one animal within the enclosure; and by the at least one animal placed within the enclosure, the steps of:

finding at least one of the animal-suitable tokens from either the plurality of first animal-suitable tokens and the plurality of second animal-suitable tokens placed within the enclosure;

depositing the found at least one animal-suitable token within the receptacle to thereby activate the mechanism for automatically releasing animal-suitable rewards; and collecting the animal-suitable rewards from the reward output;

wherein the first automated dispenser is activated by the first tokens and the second automated dispenser is activated by the second tokens.

6. The method of claim 5, wherein the first and second automated dispensers each comprises a different animal-suitable reward.

7. The method of claim 5, wherein the first and second tokens are one of either a different shape or a different color.

8. The method of claim 5, further comprising the step of teaching the at least one animal to deposit tokens within the receptacle.

9. A method for increasing healthy activity for an animal in captivity, the method comprising the steps of:

distributing at least one of a plurality of first animal-suitable tokens and a plurality of second animal-suitable tokens within an animal-suitable enclosure, wherein the first tokens are different from the second tokens;

positioning a first automated dispenser and a second automated dispenser within the enclosure, each of the first and second automated dispensers comprising:

a housing, a reservoir for containing animal-suitable rewards, a receptacle configured to accept the animal-suitable tokens, a reward output connected to the reservoir, and a mechanism for automatically releasing animal-suitable rewards from the reservoir into the reward output when an animal-suitable token from either the plurality of first animal-suitable tokens or the plurality of second animal-suitable tokens is placed in the receptacle;

placing at least one animal within the enclosure; and by the at least one animal placed within the enclosure, the steps of:

searching for the distributed animal-suitable tokens placed within the enclosure;

finding at least one distributed animal-suitable token to create at least one found token;

depositing the found token within the receptacle of one of either the first automated dispenser or the second automated dispenser to thereby activate the mechanism for automatically releasing an animal-suitable reward, wherein the first automated dispenser is activated by found tokens from the plurality of first animal-suitable tokens and the second automated dispenser is activated by found tokens from the plurality of second animal-suitable tokens; and collecting the animal-suitable reward from the corresponding reward output.

10. The method of claim 9, wherein the first and second automated dispensers each comprises a different animal-suitable reward.

11. The method of claim 9, wherein the first and second tokens are one of either a different shape or a different color.

12. The method of claim 9, further comprising the step of teaching the at least one animal to deposit tokens within the receptacle.

13. An animal enrichment system comprising:

an animal-suitable enclosure;

a plurality of first animal-suitable tokens dispersed within the enclosure;

a plurality of second animal-suitable tokens dispersed within the enclosure, wherein the second animal-suitable tokens are different from the first animal-suitable tokens;

a first automated dispenser positioned within the enclosure and comprising:

a housing, a first reservoir containing animal-suitable rewards, a second reservoir containing animal-suitable rewards, a receptacle configured to accept individual animal-suitable tokens, a reward output connected to the first and second reservoirs, and a mechanism for automatically releasing an animal-suitable reward from the first and second reservoirs into the reward output when an animal-suitable token from either the plurality of first animal-suitable tokens or the plurality of second animal-suitable tokens is placed in the receptacle;

wherein the mechanism for automatically releasing reward is activated by the first token to release animal-suitable reward from the reservoir and is activated by the second token to release animal-suitable reward from the second reservoir.

14. The animal enrichment system of claim 13, further comprising additional automated dispensers positioned within the enclosure and activated by additional tokens different from the first and second tokens.

15. The animal enrichment system of claim 14, wherein each of the automated dispensers comprises a different animal-suitable reward.

* * * * *